(12) United States Patent
Pillar et al.

(10) Patent No.: US 7,072,745 B2
(45) Date of Patent: Jul. 4, 2006

(54) REFUSE VEHICLE CONTROL SYSTEM AND METHOD

(75) Inventors: Duane R. Pillar, Oshkosh, WI (US); Gregory P. Dantzman, Owatonna, MN (US); Randall L. Bice, Rochester, MN (US); William M. Woolman, Oshkosh, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 49 days.

(21) Appl. No.: 10/314,918

(22) Filed: Dec. 9, 2002

(65) Prior Publication Data

US 2003/0130765 A1    Jul. 10, 2003

Related U.S. Application Data

(63) Continuation-in-part of application No. 09/927,946, filed on Aug. 10, 2001, and a continuation-in-part of application No. 09/384,393, filed on Aug. 27, 1999, now Pat. No. 6,421,593, and a continuation-in-part of application No. 09/364,690, filed on Jul. 30, 1999, now abandoned.

(60) Provisional application No. 60/360,479, filed on Feb. 28, 2002, provisional application No. 60/342,292, filed on Dec. 21, 2001.

(51) Int. Cl.
*G05D 1/00*    (2006.01)
*B65B 21/02*    (2006.01)
*B62D 33/06*    (2006.01)

(52) U.S. Cl. .............................. 701/1; 701/36; 701/50; 414/403; 414/408; 180/89.1; 180/89.14; 180/89.15

(58) Field of Classification Search ..................... 701/1, 701/36, 50; 414/406, 407, 408, 409, 413, 414/403; 180/89.1, 89.14, 89.15
See application file for complete search history.

(56) References Cited

U.S. PATENT DOCUMENTS

| | | | |
|---|---|---|---|
| 4,041,470 A | 8/1977 | Slane et al. |
| 4,162,714 A | 7/1979 | Correll |
| 4,180,803 A | 12/1979 | Wesemeyer et al. |
| 4,355,385 A | 10/1982 | Hampshire et al. |
| 4,453,880 A | 6/1984 | Leisse |
| 4,516,121 A | 5/1985 | Moriyama et al. |

(Continued)

FOREIGN PATENT DOCUMENTS

DE    4041483 A1    6/1992

(Continued)

OTHER PUBLICATIONS

International Search Report for Application PCT/US2003/40103; mailed May 24, 2004 (10 pages).

(Continued)

*Primary Examiner*—Thomas G. Black
*Assistant Examiner*—Brian J. Broadhead
(74) *Attorney, Agent, or Firm*—Foley & Lardner LLP

(57) ABSTRACT

A refuse vehicle is disclosed comprising a refuse loader capable of moving a load of refuse along a path and into the refuse vehicle and an electronic control system capable of controlling the refuse loader. The refuse loader controlled by the electronic control system is capable of moving the load along the path and performing an operation in relation to a position along the path.

31 Claims, 10 Drawing Sheets

U.S. PATENT DOCUMENTS

| | | | |
|---|---|---|---|
| 4,542,802 A | 9/1985 | Garvey et al. | |
| RE32,140 E | 5/1986 | Tokuda et al. | |
| 4,639,609 A | 1/1987 | Floyd et al. | |
| 4,646,232 A | 2/1987 | Chang et al. | |
| 4,744,218 A | 5/1988 | Edwards et al. | |
| 4,760,275 A | 7/1988 | Sato et al. | |
| 4,809,177 A | 2/1989 | Windle et al. | |
| 4,809,803 A | 3/1989 | Ahern et al. | |
| 4,843,557 A | 6/1989 | Ina et al. | |
| 4,864,154 A | 9/1989 | Copeland et al. | |
| 4,864,568 A | 9/1989 | Sato et al. | |
| 4,894,781 A | 1/1990 | Sato et al. | |
| 4,941,546 A | 7/1990 | Nist et al. | |
| 4,949,808 A | 8/1990 | Garnett | |
| 5,025,253 A | 6/1991 | DiLullo et al. | |
| 5,071,307 A | 12/1991 | Carson | |
| 5,091,856 A | 2/1992 | Hasegawa et al. | |
| 5,189,617 A | 2/1993 | Shiraishi | |
| 5,215,423 A | 6/1993 | Schulte-Hinsken et al. | |
| 5,222,853 A | 6/1993 | Carson | |
| 5,365,436 A | 11/1994 | Schaller et al. | |
| 5,416,702 A | 5/1995 | Kitagawa et al. | |
| 5,463,992 A | 11/1995 | Swenson et al. | |
| 5,470,187 A | 11/1995 | Smith et al. | |
| 5,508,689 A * | 4/1996 | Rado et al. | 340/3.1 |
| 5,555,171 A | 9/1996 | Sonehara et al. | |
| 5,557,257 A | 9/1996 | Gieffers | |
| 5,601,392 A | 2/1997 | Smith et al. | |
| 5,623,169 A | 4/1997 | Sugimoto et al. | |
| 5,637,933 A | 6/1997 | Rawlings et al. | |
| 5,638,272 A | 6/1997 | Minowa et al. | |
| 5,657,224 A | 8/1997 | Lonn et al. | |
| 5,670,845 A | 9/1997 | Grant et al. | |
| 5,736,925 A | 4/1998 | Knauff et al. | |
| 5,739,592 A | 4/1998 | Rigsby et al. | |
| 5,754,021 A | 5/1998 | Kojima | |
| 5,793,648 A | 8/1998 | Nagle et al. | |
| 5,794,165 A | 8/1998 | Minowa et al. | |
| 5,819,188 A | 10/1998 | Vos | |
| 5,827,957 A | 10/1998 | Wehinger | |
| 5,845,221 A | 12/1998 | Hosokawa et al. | |
| 5,848,365 A | 12/1998 | Coverdill | |
| 5,851,100 A | 12/1998 | Brandt | |
| 5,864,781 A | 1/1999 | White | |
| 5,884,206 A | 3/1999 | Kim | |
| 5,890,080 A | 3/1999 | Coverdill et al. | |
| 5,890,865 A | 4/1999 | Smith et al. | |
| 5,896,418 A | 4/1999 | Hamano et al. | |
| 5,919,237 A | 7/1999 | Balliet | |
| 5,948,025 A | 9/1999 | Sonoda | |
| 5,949,330 A | 9/1999 | Hoffman et al. | |
| 5,954,470 A | 9/1999 | Duell et al. | |
| 5,957,985 A | 9/1999 | Wong et al. | |
| 5,987,365 A | 11/1999 | Okamoto | |
| 5,997,338 A | 12/1999 | Pohjola | |
| 5,999,104 A | 12/1999 | Symanow et al. | |
| 6,012,004 A | 1/2000 | Sugano et al. | |
| 6,038,500 A | 3/2000 | Weiss | |
| 6,096,978 A | 8/2000 | Pohjola | |
| 6,123,497 A | 9/2000 | Duell et al. | |
| 6,135,806 A | 10/2000 | Pohjola | |
| 6,141,610 A | 10/2000 | Rothert et al. | |
| 6,152,673 A * | 11/2000 | Anderson et al. | 414/408 |
| 6,154,122 A | 11/2000 | Menze | |
| 6,182,807 B1 | 2/2001 | Saito et al. | |
| 6,223,104 B1 | 4/2001 | Kamen et al. | |
| 6,263,269 B1 | 7/2001 | Dannenberg | |
| 6,332,745 B1 * | 12/2001 | Duell et al. | 414/406 |
| 6,338,010 B1 | 1/2002 | Sparks et al. | |
| 6,356,826 B1 | 3/2002 | Pohjola | |
| 6,404,607 B1 | 6/2002 | Burgess et al. | |
| 6,421,593 B1 | 7/2002 | Kempen et al. | |
| 6,430,488 B1 | 8/2002 | Goldman et al. | |
| 6,434,512 B1 | 8/2002 | Discenzo | |
| 6,496,775 B1 | 12/2002 | McDonald, Jr. et al. | |
| 6,501,368 B1 | 12/2002 | Wiebe et al. | |
| 6,553,290 B1 | 4/2003 | Pillar | |
| 6,580,953 B1 | 6/2003 | Wiebe et al. | |
| 6,611,755 B1 | 8/2003 | Coffee et al. | |
| 6,757,597 B1 | 6/2004 | Yakes et al. | |
| 6,882,917 B1 | 4/2005 | Pillar et al. | |
| 6,885,920 B1 | 4/2005 | Yakes et al. | |
| 2002/0065594 A1 | 5/2002 | Squires et al. | |
| 2003/0031543 A1 * | 2/2003 | Elbrink | 414/408 |
| 2003/0080619 A1 | 5/2003 | Bray et al. | |
| 2003/0130765 A1 | 7/2003 | Pillar et al. | |
| 2003/0158635 A1 | 8/2003 | Pillar et al. | |
| 2003/0158638 A1 | 8/2003 | Yakes et al. | |
| 2003/0158640 A1 | 8/2003 | Pillar et al. | |
| 2003/0163228 A1 | 8/2003 | Pillar et al. | |
| 2003/0163229 A1 | 8/2003 | Pillar et al. | |
| 2003/0163230 A1 | 8/2003 | Pillar et al. | |
| 2003/0171854 A1 | 9/2003 | Pillar et al. | |
| 2003/0195680 A1 | 10/2003 | Pillar | |
| 2003/0200015 A1 | 10/2003 | Pillar | |
| 2003/0205422 A1 | 11/2003 | Morrow et al. | |
| 2004/0002794 A1 | 1/2004 | Pillar et al. | |
| 2004/0019414 A1 | 1/2004 | Pillar et al. | |
| 2004/0024502 A1 | 2/2004 | Squires et al. | |
| 2004/0039510 A1 | 2/2004 | Archer et al. | |
| 2004/0055802 A1 | 3/2004 | Pillar et al. | |
| 2004/0069865 A1 | 4/2004 | Rowe et al. | |
| 2004/0133319 A1 | 7/2004 | Pillar et al. | |
| 2004/0133332 A1 | 7/2004 | Yakes et al. | |
| 2004/0199302 A1 | 10/2004 | Pillar et al. | |
| 2005/0004733 A1 | 1/2005 | Pillar et al. | |
| 2005/0038934 A1 | 2/2005 | Gotze et al. | |
| 2005/0113988 A1 | 5/2005 | Nasr et al. | |
| 2005/0113996 A1 | 5/2005 | Pillar et al. | |
| 2005/0114007 A1 | 5/2005 | Pillar et al. | |
| 2005/0119806 A1 | 6/2005 | Nasr et al. | |
| 2005/0131600 A1 | 6/2005 | Quigley et al. | |

FOREIGN PATENT DOCUMENTS

| | | |
|---|---|---|
| EP | 0 266 704 | 5/1988 |
| EP | 0 496 302 B1 | 7/1992 |
| EP | 0 504 913 | 9/1992 |
| EP | 0 564 943 | 10/1993 |
| EP | 0 630 831 A1 | 12/1994 |
| EP | 0 791 506 | 8/1997 |
| EP | 0 894 739 A1 | 2/1999 |
| EP | 1 229 636 | 8/2002 |
| SE | 507 046 | 3/1998 |
| WO | WO 93/10951 | 6/1993 |
| WO | WO 95/15594 | 6/1995 |
| WO | WO 96/32346 | 10/1996 |
| WO | WO 96/40573 | 12/1996 |
| WO | WO 97/02965 | 1/1997 |
| WO | WO 98/30961 | 7/1998 |
| WO | WO 00/69662 | 11/2000 |

OTHER PUBLICATIONS

"The One to Count on Through Hell and High Water"; 4-page (as photocopied) brochure; Product of Oshkosh Truck Corporation; (Sep. 2000).

"Palletized Load System (PLS)—PLS Potable Water Distributor Module"; 2-page (as photocopied) brochure; Product of Oshkosh Truck Corporation, Date: See IDS.

"Palletized Load System (PLS)—Concrete Mobile Mixer Module"; 2-page (as photocopied) brochure; Product of Oshkosh Truck Corporation, Date: See IDS.

"Oshkosh Trucks—75 Years of Specialty Truck Production"; Wright et al.; (pp. 119-126); Motorbooks International Publishers & Wholesalers (1992).

"MTVR Wrecker Variant (MK36 Wrecker Recovery Vehicle)"; 2-page (as photocopied) brochure; Product of Oshkosh Truck Corporation; (Sep. 2001).

"MTVR Dump Body Variant (Medium Tactical Vehicle Replacement)"; 2-page (as photocopied) brochure; Product of Oshkosh Truck Corporation; (Sep. 2001).

" Medium Tactical Vehicle Replacement"; 6-page (as photocopied) brochure; Product of Oshkosh Truck Corporation; (Aug. 2000).

"M1977 CBT (Common Bridge Transporter)"; 2-page (as photocopied) brochure; Product of Oshkosh Truck Corporation, Date: See IDS.

"M1070F Heavy Equipment Transporter & Trailer"; 8-page (as photocopied) brochure; Product of Oshkosh Truck Corporation; (Sep. 2001).

"LVS—Logistic Vehicle System (MK48 Series)"; 6-page document; Product of Oshkosh Truck Corporation, Date: See IDS.

"LHS Decontamination Mission Module"; 2-page (as photocopied) brochure; Product of Oshkosh Truck Corporation, Date: See IDS.

Aircraft Internal Time Division Multiplex Data Bus, MIL-STD-1553(USAF); 29 pgs.; (Aug. 30, 1973).

"HEMTT—Heavy Expanded Mobility Tactical Truck M977 Series Truck"; 12-page (as photocopied) brochure; Product of Oshkosh Truck Corporation; (Mar. 2000).

"Oshkosh Demonstrates ProPulse, the First Electric Hybrid—Drive Heavy Defense Truck," Oshkosh Truck Corp., Feb. 27, 2000 (2 pages).

"Oshkosh Showcases ProPulse Hybrid Electric System at Major Defense Exhibition," Oshkosh Truck Corp., Oct. 21, 2002 (1 page).

"Oshkosh Truck Rolls Out Next Generation of Command Zone Advanced Electronics System to Military Market," Oshkosh Truck Corp., Oct. 21, 2002 (2 pages).

"Oshkosh Truck's Robotic Truck Qualifies for Pentagon's $1 Million Desert Race," Oshkosh Truck Corp., Mar. 12, 2004 (2 pages).

"Oshkosh Truck and Ohio State University Design Robotic Vehicle to Compete in Desert Race," Oshkosh Truck Corp., Feb. 11, 2004 (2 pages).

"Oshkosh Truck Awarded Contract for U.S. Army Future Tactical Truck Concepts and Technology Evaluations," Oshkosh Truck Corp., Dec. 2, 2003 (2 pages).

"Oshkosh Receives Federal Government Funding to Develop ProPulse Alternative Drive System for Military Trucks," Oshkosh Truck Corp., Aug. 31, 2001 (2 pages).

Dana Corporation, Kalamazoo, Michigan, "Dana® Spicer® Central Tire Inflation System Specifications," www.dana.com, May 2000 (2 pages).

International Search Report for Application No. PCT/US2004/031253, mailed Dec. 21, 2004 (20 pages).

Instruction and Parts Manual, Machine type: GCB 1000 SPLIT, May 23, 2002, 80 pages, Geesink Norba Group.

Instruction and Parts Manual, Machine type: GPM lle, Jul. 10, 2002, 74 pages, Geesink Norba Group.

Instruction Manual for the Training AS-i bus, Aug. 2002, 31 pages, Version 3.0, Geesink Norba Group.

* cited by examiner

REFUSE VEHICLE CONTROL SYSTEM AND METHOD

CROSS-REFERENCE TO RELATED PATENT APPLICATIONS

This application is a continuation-in-part of U.S. Ser. No. 09/927,946, filed Aug. 10, 2001, pending, which is a continuation-in-part of U.S. Ser. No. 09/384,393, filed Aug. 27, 1999, now U.S. Pat. No. 6,421,593, which is a continuation-in-part of U.S. Ser. No. 09/364,690, filed Jul. 30, 1999, abandoned, each of which is hereby expressly incorporated by reference. This application also claims priority to U.S. Prov. No. 60/342,292, filed Dec. 21, 2001, also hereby expressly incorporated by reference.

FIELD OF THE INVENTION

The present invention relates generally to the field of refuse vehicles. More specifically, the present invention relates to refuse vehicle control systems for refuse vehicles.

BACKGROUND OF THE INVENTION

Various vehicles are known for use in collecting and transporting refuse. Refuse vehicles often employ a refuse loader to load refuse into the refuse vehicle's refuse container. One example of such a refuse loader is a refuse vehicle having a front loader. Such front loaders typically comprise a pair of arms and forks which are movable with electric, hydraulic, or pneumatic actuator systems. When loading refuse, the front loader's forks may be received by a refuse bin. The arms may then be raised which, in turn, raises the forks and the refuse bin. In this manner, the refuse bin may be raised over the cab of the refuse vehicle where the refuse can be deposited into a hopper. Typically, this process of loading refuse is controlled by a human operator.

Unfortunately, this process has a number of disadvantages. In some situations, a portion of the refuse fails to fall out of the refuse bin and into the hopper. In these situations, the operator can shake the refuse bin a few times to loosen the refuse. Typically, the operator shakes the refuse bin by moving either or both the forks and arms in short repetitive movements. The forks and arms are often near mechanical stops when these short repetitive movements occur. Unfortunately, these repetitive movements may result in the arms and forks reaching their mechanical stops causing undue wear and tear on the front loader. This wear and tear may decrease the operative life of the front loader and result in increased repair and maintenance costs.

In other situations, refuse vehicles having front loaders may spill refuse on the ground as the refuse bin is being lifted. This is often a problem when the refuse bin has been overfilled. As the arms and forks rise, the forks and refuse bin gradually transition from being in largely a horizontal position to a more vertical position in preparation for the refuse bin to be dumped in the hopper. During this transition, refuse may be spilled. When refuse spills, the operator must exit the refuse vehicle, manually load the refuse into the refuse bin, reenter the refuse vehicle, and, using the front loader, empty the refuse bin. This process results in a significant loss of efficiency for the operator of the refuse vehicle. In addition to the efficiency loss, some of the spilled refuse may be blown away or scattered such that it would take too much of the operator's time to put it back in the refuse bin. The result may be refuse distributed near and around the location of a refuse bin. This is very undesirable aesthetically and may have significant negative environmental impacts on the surrounding area.

Further, in other situations, the operator of the refuse vehicle may have difficulty determining the location of the arms and forks. This may especially be a problem when the arms and forks are located above the cab of the refuse vehicle and out of sight of the operator. The operator may need to be able to quickly determine the position of the forks or arms, e.g., the operator needs to know whether the forks are stowed in preparation for the refuse vehicle to travel. Unfortunately, the operator is typically limited to visually verifying the position of the arms and forks.

In other situations, the operator may not be aware of the position of the various components of the refuse vehicle and attempt to perform a function that may result in damaging the refuse vehicle or spilling refuse. For example, an operator of a front loading refuse vehicle may forget to open the door of the hopper before attempting to move a load into the hopper. Such a mistake may result in spilled refuse distributed on the vehicle and the adjacent ground. Another example might occur when the operator extends the packer to push the refuse out of the refuse container without remembering to open the tailgate. In this situation, the refuse would be pressed up against the tailgate by the packer with tremendous force. This may result in significant and costly damage to the refuse vehicle.

Accordingly, it would be desirable to provide a control system for a refuse vehicle having a refuse loader which overcomes one or more of the above-mentioned problems. Advantageously, such a control system would enhance many aspects of refuse collection and transportation. The techniques below extend to those embodiments which fall within the scope of the appended claims, regardless of whether they provide any of the above-mentioned advantageous features.

SUMMARY OF THE INVENTION

A refuse vehicle is disclosed comprising a refuse loader capable of moving a load of refuse along a path and into the refuse vehicle and an electronic control system capable of controlling the refuse loader. The refuse loader controlled by the electronic control system is capable of moving the load along the path and performing an operation in relation to a position along the path.

According to another embodiment, a refuse vehicle is disclosed comprising a refuse loader, the refuse loader being capable of moving a load along a path and into the refuse vehicle. The refuse vehicle further includes an electronic control system capable of controlling movement of the refuse loader along the path. The refuse loader controlled by electronic control system is capable of (a) moving the load along the path and performing an operation in relation to a position along the path, and (b) repeating step (a) using substantially the same operation and substantially the same position.

According to another embodiment, a refuse vehicle is disclosed comprising a refuse loader. The refuse loader comprises arms movably mounted to a frame and vehicle body combination and forks movably mounted to the arms, the forks being capable of receiving a load. The refuse loader is capable of moving a load along a path and into the refuse vehicle. The refuse vehicle further comprises an electronic control system comprising a plurality of actuators, the plurality of actuators being capable of adjusting the position of the refuse loader. The electronic control system controls the refuse loader as the refuse loader moves the load along the path and into the refuse vehicle. The electronic control system being capable of controlling the refuse loader to perform an operation in relation to a position along the path.

According to another embodiment, a method of operating a refuse vehicle is disclosed comprising moving a load of refuse along a path and into the refuse vehicle. The moving step being controlled by an electronic control system. The moving step also includes performing an operation in relation to a position along the path.

DETAILED DESCRIPTION OF THE PREFERRED EMBODIMENTS

Figure 1:
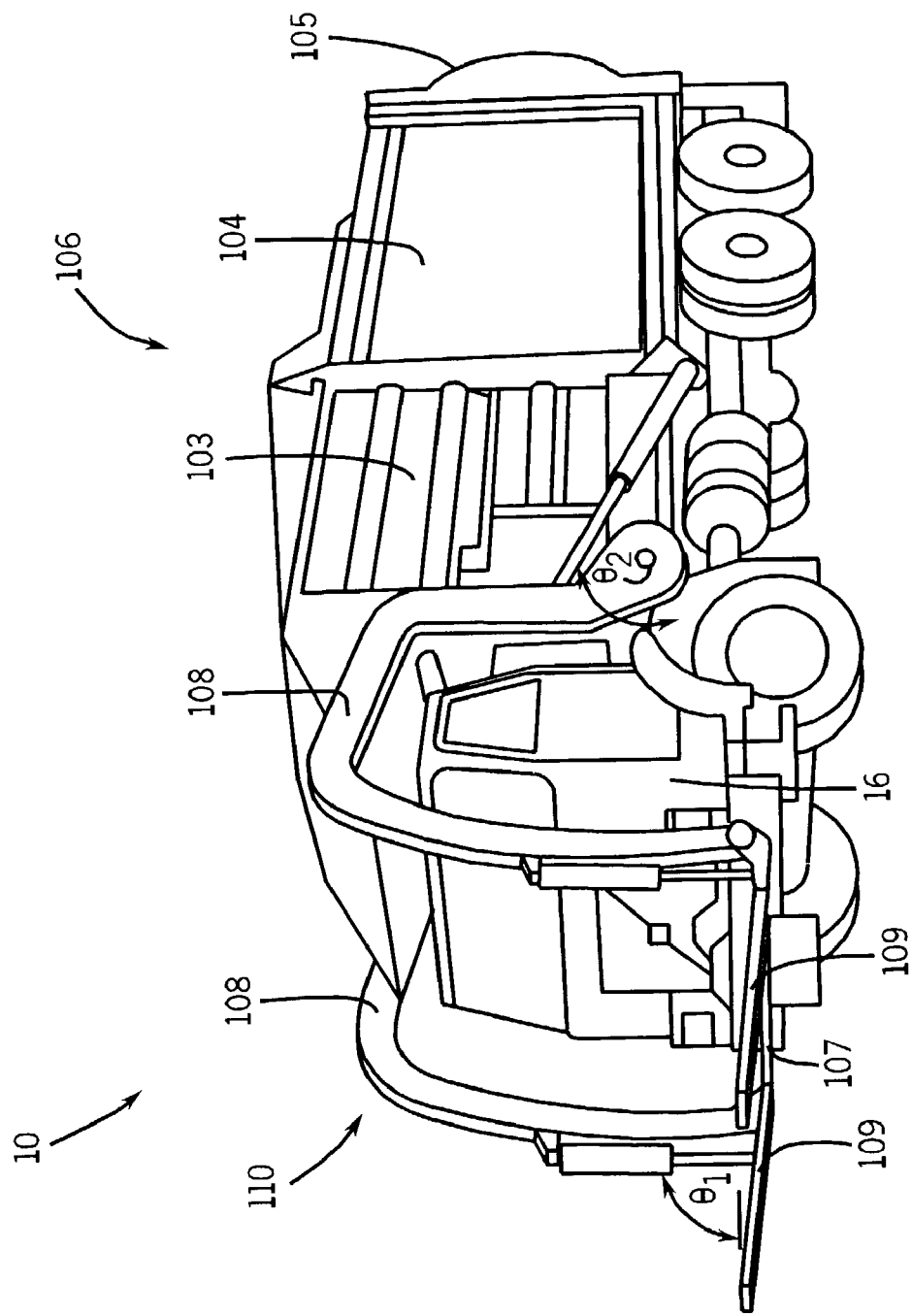
FIG. 1 is a perspective view of a refuse vehicle having a control system according to one embodiment of the present invention.

Referring to FIG. 1, one embodiment of a refuse vehicle 10 is illustrated. By way of overview, the refuse vehicle 10 generally includes a chassis and a vehicle body mounted on the chassis, with the chassis and the vehicle body in combination including an operator compartment 16 capable of receiving a human operator. The operator compartment 16 further includes steering and throttle controls for receiving operator inputs to control the movement of the refuse vehicle 10 along a road. A refuse loader 110 may be mounted to refuse vehicle 10, and can be configured to move a load of refuse along a path and into the refuse vehicle 10.

It should be understood that FIG. 1 merely illustrates one embodiment, and the refuse vehicle 10 may include a variety of configurations. For example, in FIG. 1, the refuse vehicle 10 includes a front loading refuse loader. However, it should be understood that the applicability of the present disclosure is not limited to front loading refuse vehicles. Rather, other types of refuse vehicles may be used such as rear loaders, side loaders, bucket loaders, automated side loaders, etc. It should also be noted that the teachings herein do not depend on the exact configuration, construction, size, or assembly of the refuse vehicle 10.

The refuse vehicle may include a refuse container 106. The refuse container 106 is often configured to store the refuse as the refuse vehicle 10 collects it. Once the refuse container 106 is full, it can be emptied at a suitable location or facility. The refuse container 106 can be emptied in a variety of ways. Two conventional methods for emptying the refuse container are gravity dumping and ejecting the refuse using a packer. Gravity dumping of the refuse is typically accomplished by raising one end of the refuse container 106 so that the force of gravity causes the refuse to fall out the other end. Ejecting the refuse using a packer is accomplished by opening a tailgate 105 at one end of the refuse container 106 and, using a packer, pushing the refuse out the open end of the refuse container 106. The packer, not depicted in FIG. 1, can be of any type and configuration that is able to pack the refuse inside the refuse container 106. Optionally, as described above, the packer can push the refuse out one end of the refuse container 106. It should be understood that other methods of emptying the refuse vehicle 10 may be used as well.

The refuse container 106 may further include a body 104 adjacent or separate from a hopper 103. Typically, when refuse is placed into the refuse vehicle 10, the refuse is initially deposited in the hopper 103 and then the packer pushes the refuse from the hopper 103 portion of the refuse container 106 into the body 104.

The hopper 103 illustrated in FIG. 1 may include a door that can be in an open or closed position. When the door is in a closed position, it can prevent refuse from spilling out of the hopper 103 while, for example, the refuse vehicle 10 is traveling down a road. The door may be opened to allow the hopper 103 and, thus, the refuse container 106 to be filled with refuse. It should be appreciated that the hopper 103 is not to be limited to the hopper shown in FIG. 1. Rather, the hopper 103 may be placed at various locations on a refuse vehicle and include a number of configurations. For example, on a rear loading refuse vehicle the hopper may be located to allow an operator, cart tipper, etc. to put refuse into the hopper. This may require the hopper's location to be closer to the ground for easy access by the human operator.

The refuse loader 110, shown in FIG. 1, includes forks 109 and arms 108. It should be understood that the term refuse loader is neither limited to including only forks 109 and arms 108 nor required to include forks 109 and arms 108. Rather, the term refuse loader is intended to include those mechanical components of a refuse vehicle that play a substantial role in moving a load of refuse into the refuse vehicle 10. This may include various combinations of components such as forks 109, arms 108, actuators 132, etc. It may also include other configurations of refuse loaders than the refuse loader 110 shown in FIG. 1. For example, it may include refuse loaders that are commonly used on side loading refuse vehicles.

In one embodiment, the refuse loader 110 includes an arm 108 on each side of the refuse vehicle 10, a cross member 107 connecting the arms 108, and a pair of forks 109 connected to the cross member 107. The cross member 107 is hingedly movable relative to the arms 108 along the axis indicated by θ1. The forks 109 may be fixed to the cross member 107 so that as the cross member 107 moves along axis θ1, the forks 109 move with the cross member 107. In another embodiment, the forks 109 may be mounted for movement longitudinally in relation to or in conjunction with the cross member 107. The forks 109 are capable of being in a working position, which is generally perpendicular to the arms 108, or in a stowed position, which is generally parallel to the arms 108, or in any position in between. As will be appreciated, the forks 109 may be of different sizes and configurations than what is shown in FIG. 1. For example, the forks 109 may be connected directly to the arms 108 without using a cross member 107. Also, although the forks 109 are shown as being capable of being in a working or stowed position, the forks 109 can also be capable of being in a variety of other positions with respect to the arms 108 and/or cross member 107 including positions where the forks 109 are positioned to point towards the ground in any degree.

The arms 108 are preferably configured to mount to the side of the refuse vehicle 10. In one embodiment, the arms 108 are movably mounted to the refuse vehicle 10 directly behind the operator compartment 16. The arms are capable of moving along the axis indicated by $\theta 2$. The arms 108 are generally shaped in an upside down U shape, which allows the operator easy access to the operator compartment 16. In a preferred embodiment, the forks 109 and arms 108 are capable of being moved at the same time. For example, while the arms 108 are rising, the forks 109 could be adjusted. It should be understood that the arms 108 can vary substantially in shape and configuration and be within the scope of the invention.

Figure 2:
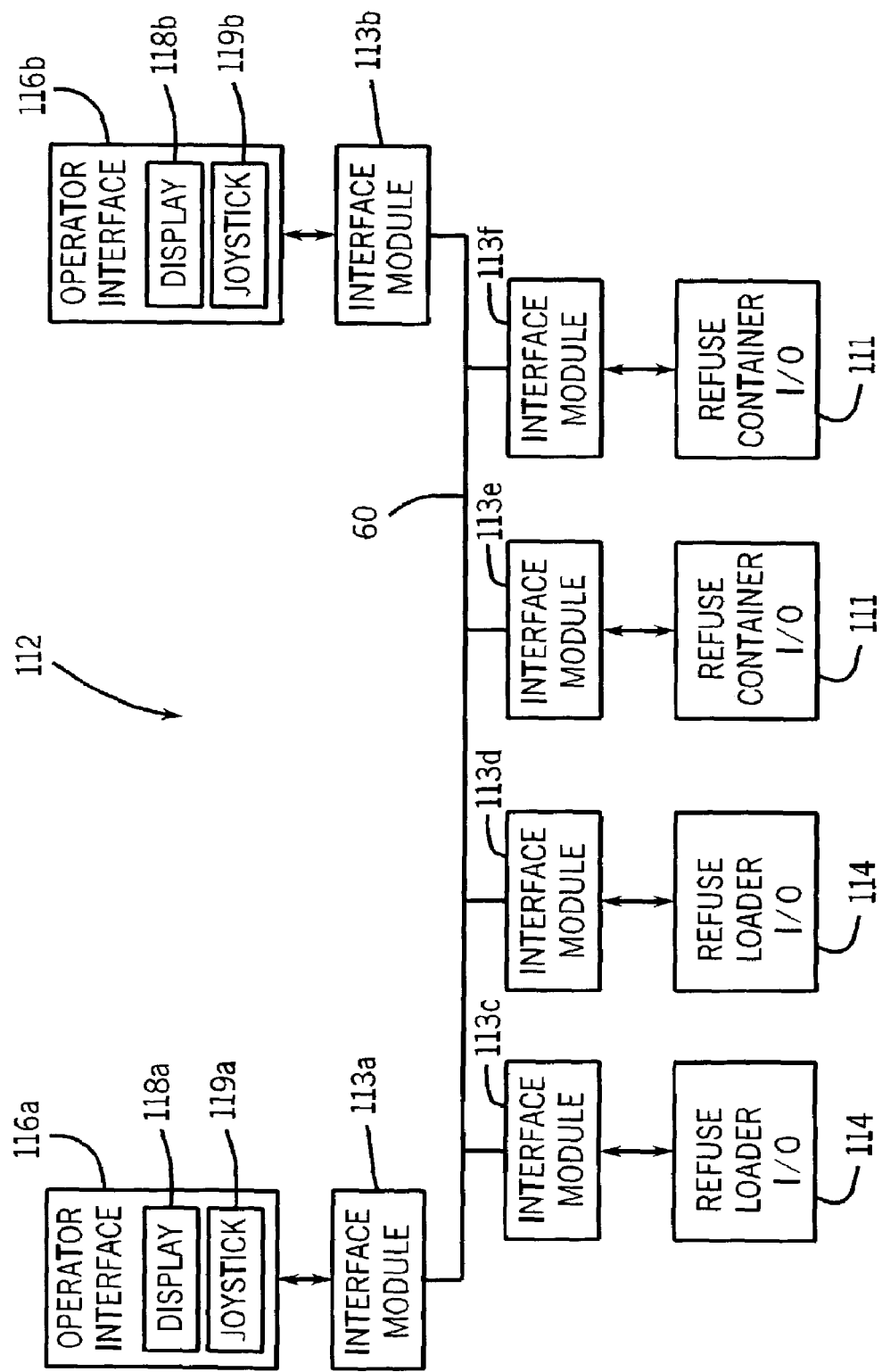
FIG. 2 is a block diagram of a refuse vehicle control system.
Figure 3:
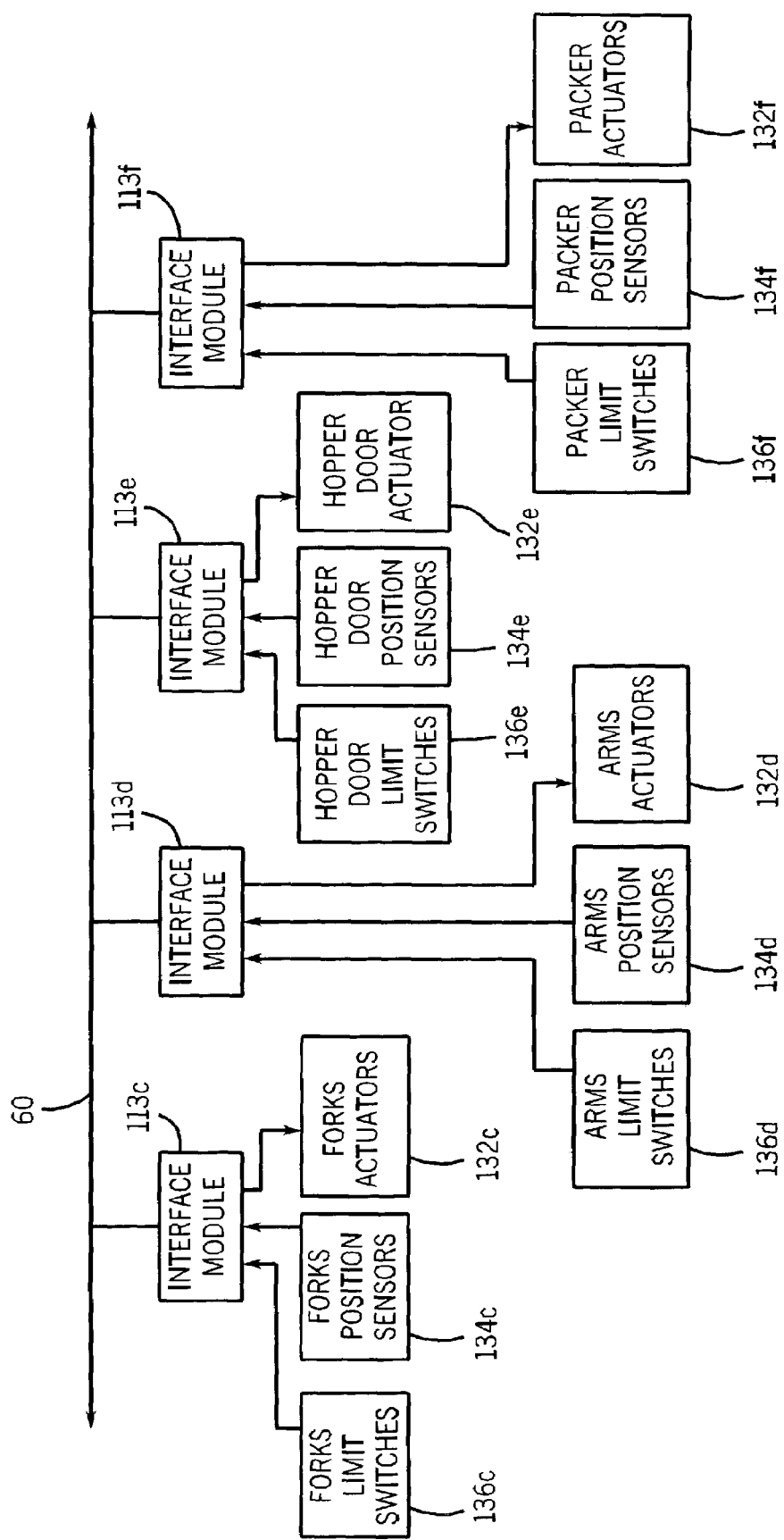
FIG. 3 is a block diagram of a refuse vehicle control system capable of controlling the identified components of a refuse vehicle.

Referring to FIGS. 2 and 3, a refuse vehicle control system 112 according to an embodiment of the invention is illustrated. Referring first to FIG. 2, FIG. 2 is an overview of the preferred refuse vehicle control system 112 for controlling the refuse vehicle 10 and/or its various components such as refuse loader 110 or refuse container 106. The refuse vehicle control system 112 includes a plurality of interface modules 113a–113f (collectively, "the interface modules 113"), refuse loader I/O devices 114, refuse container I/O devices 111, and one or more operator interfaces 116a and 116b (collectively, "the operator interfaces 116").

The refuse vehicle control system 112 may be implemented in a variety of ways. In a preferred embodiment the control system controls all or a large majority of the operations and components of the refuse vehicle. Separate engine, transmission, brake, and tire inflation control systems may be provided, however, such control systems are preferably coupled to the control system 112 by way of a network communication link. The control system 112 may also control optional equipment on the refuse vehicle 10 such as a residential control package or an automated carry container. In another embodiment, the refuse vehicle control system 112 may be implemented to control only one aspect of the refuse vehicle 10 such as the refuse loader 110. The control system may also comprise multiple smaller control systems that are interconnected or separate. In an exemplary embodiment, the control system is an electronic control system that is microprocessor-based.

The operator interfaces 116a and 116b each include display 118a and 118b (collectively, "the displays 118") and joysticks 119a and 119b (collectively, "the joysticks 119"). The operator interfaces 116 may be located in a variety of positions around the refuse vehicle 10. For example, the operator interface 116a may be located in the operator compartment 16 of the refuse vehicle 10 and the other operator interface 116b may be located at another location, such as a rear or side location of the refuse vehicle 10. In addition, the refuse vehicle 10 may be configured with more or fewer operator interfaces 116. For example, the refuse vehicle 10 may be configured to have an operator interface 116 in an operator compartment 16 and also have an operator interface 116 on each side of the refuse vehicle 10. Distributing the operator interfaces 116 in various locations around the refuse vehicle 10 allows the operator or operators multiple access points to control the operation of the refuse vehicle 10 without requiring the operator to enter the operator compartment 16 each time.

As discussed in greater detail in connection with FIG. 3, the refuse loader I/O devices 114 and refuse container I/O devices 111 include actuators 132c–132f (collectively, "the actuators 132"), position sensors 134c–134f (collectively, "the position sensors 134"), limit switches 136c–136f (collectively, "the limit switches 136"), and other devices used to control refuse vehicle 10 and/or its various components such as refuse loader 110 or refuse container 106. As shown in FIG. 3, the actuators 132, position sensors 134, and limit switches 136 may be used to control the forks 109, arms 108, hopper 103, and packer. It should be understood that other aspects of the refuse vehicle 10 may be controlled in addition to those shown in FIG. 2. The components disclosed in FIG. 2 are only by way of example and should not be construed to limit the applicability of the present disclosure to controlling only those components.

With regard to the forks 109, in a preferred embodiment, a position sensor 134c or limit switch 136c may measure movement of the forks 109 along the axis $\theta 1$. Also, a limit switch 136c or position sensor 134c may be used to ascertain whether a fork 109 is at or near its physical limits on motion such as, for example, when a hydraulic cylinder nears its mechanical stop point(s). In another embodiment, a position sensor 134c may be used to determine the position of the forks 109 as a point in one axis of a multi-axis coordinate system.

With regard to the arms 108, in a preferred embodiment, a position sensor 134d measures movement of the arms 108 along the axis $\theta 2$. Also, a limit switch 136d or position sensor 134d may be used to ascertain whether the arm 108 is at or near its mechanical stops such as, for example, when a hydraulic cylinder reaches its end points. In another embodiment, a position sensor 134d may be used to determine the position of the arms 108 as a point in a multi-axis coordinate system.

With regard to the hopper 103, in a preferred embodiment, a position sensor 134e or limit switch 136e may be used to determine the position of the hopper door. Likewise, a limit switch 136f or position sensor 134f may be used to ascertain the position of the packer. These positions can then be fed to interface modules 113e and 113f respectively where the are broadcast to the other interface modules 113 in the refuse vehicle control system 112.

It should be noted that components of the refuse vehicle used as part of the refuse vehicle control system 112 may also make up other portions of the refuse vehicle 10. For example, the refuse vehicle control system 112 and the refuse loader 110 may both include the same actuators 132c and 132d.

The interface modules 113 are preferably locally disposed with respect to the respective input and output devices to which each interface module is coupled so as to permit distributed data collection from the plurality of input devices and distributed power distribution to the plurality of output devices. Of course, each of the interface modules 113 may, in addition, be coupled to other non-local input devices and output devices. Further, the control system 112 can also include input devices and output devices which are not connected to the interface modules 113.

As shown in FIG. 3, the position indicators or sensors 134c–134f and the limit switches 136c–136f are connected as input devices to the interface modules 113c–113f. The interface modules 113c–113f thereby receive the position information pertaining to the position and orientation of the forks 109, arms 108, refuse loader 110 (typically determined using the position of the one of the refuse loader's components such as the arms 108), hopper 103, and packer. The actuators 132c–132f are connected as output devices to the interface modules 113c–113f. The interface modules 113c–113f provide the actuators 132 with control signals to adjust the forks 109, arms 108, hopper 103, and packer. The actuators 132, the position sensors 134, and the limit switches 136 collectively correspond to the "refuse loader I/O devices" and the "refuse container I/O devices" which are labeled with the reference numbers 114 and 111, respectively, in FIG. 2. Other I/O devices may also be used. The interface modules 113c–113f may be located near or on the forks 109, arms 108, hopper 103, or packer of the refuse vehicle 10, or, alternatively, the interface modules 113c–113f may be located anywhere on the refuse vehicle 10, for example, near where the arms 108 connect to the refuse vehicle 10.

The position sensors 134 may be encoders, resolvers or other suitable position measuring devices. The actuators 132 may be electrically, mechanically, or hydraulically controlled valves that control the flow of hydraulic power to the refuse loader 110 or refuse container 103 and individually to the forks 109, arms 108, hopper 103, and packer. Alternatively, the actuators may be an electric motor. Other arrangements could also be used.

The joysticks 119 are preferably multi-axis joysticks, with the refuse vehicle control system 112 being capable of receiving operator inputs from either joystick 119a, 119b and using the operator inputs to control the various components of the refuse vehicle 10. Preferably, the joysticks 119 can selectively control the refuse loader 110. However, it should be understood that the joysticks 119 may also be configured to control the refuse container and its various components such as the hopper door, tailgate 105, packer, etc.

The joysticks 119 may be configured to control the refuse loader 110 as follows. For example, the joysticks may be two-axis joysticks, with left to right corresponding to forks 109 raise/lower, forward and back corresponding to arms 108 raise/lower. In this configuration, the forks 109 are fixed to the cross member 107. In an alternative embodiment, the forks 109 may be capable of moving longitudinally in relation to the cross member 107. In this situation, a momentary pushbutton may be used so that when depressed, left and right movement of the joystick corresponds to forks 109 widen/narrow. Additionally, a three-axis joystick may be used where twisting the joystick clockwise and counterclockwise corresponds to forks 109 widen/narrow. Additional or alternative operator input devices may be used depending on what type of operator input is desired.

Because the joysticks 119 are coupled to the actuators 132 through the refuse vehicle controller 160, the refuse vehicle controller 160 can process the operator inputs from the joysticks 119 to provide user-friendly control of the actuators 132. For example, the refuse vehicle controller 160 may be programmed to increase the speed of movement of the arms 108 as the operator maintains a particular joystick position. For example, if the operator holds the joystick 119a or 119b in the left position, the speed of upward movement of the forks 109 may be programmed to increase the longer the joystick-left position is maintained.

Figure 4:
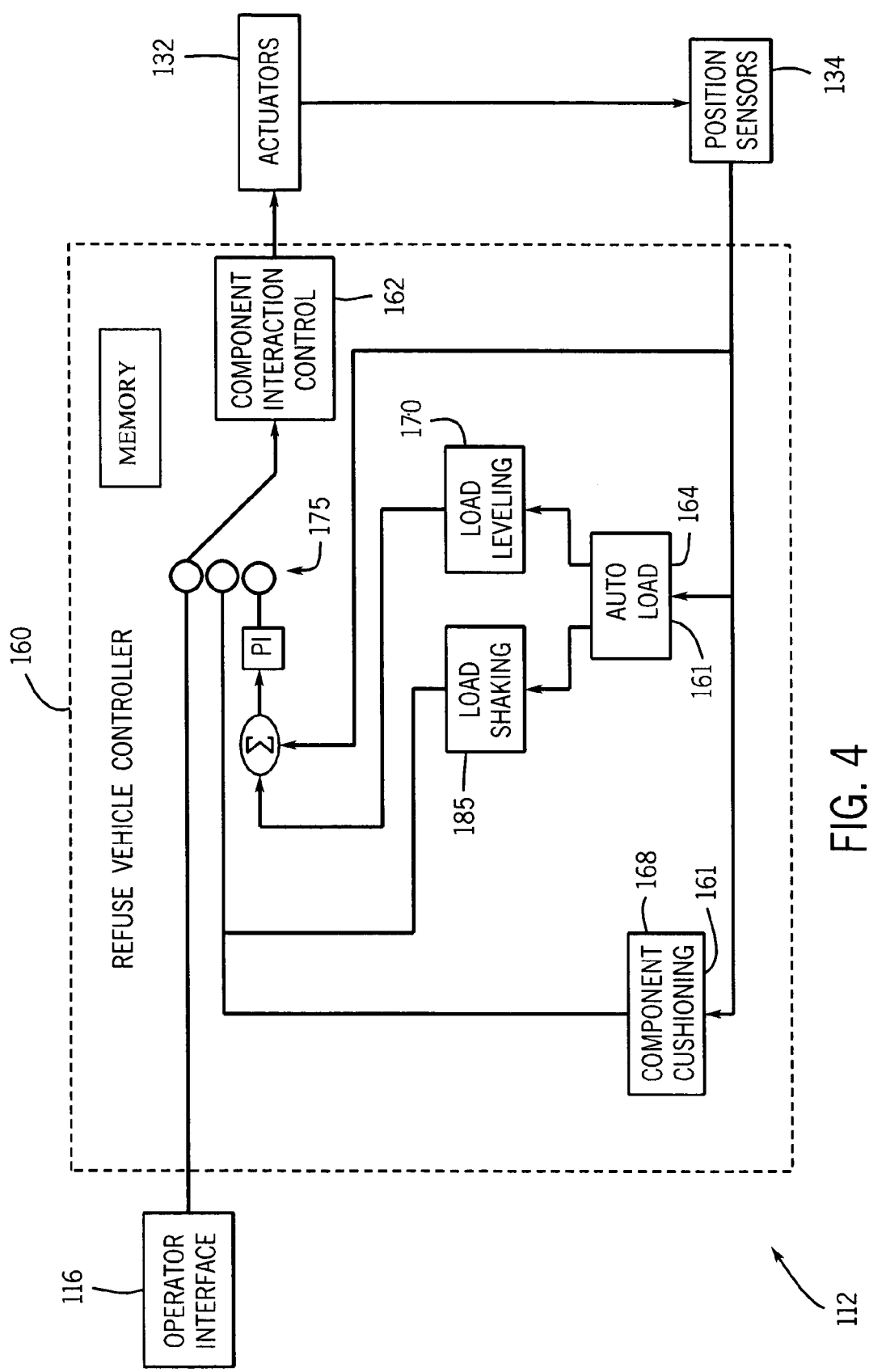
FIG. 4 is a block diagram showing selected aspects of the control system of FIG. 3 in greater detail.

Referring now to FIG. 4, the arrangement of FIGS. 2 and 3 can be used to implement a variety of advantageous features or operations, such as auto load, component cushioning, component interaction control, and other features. FIG. 4 is a block diagram of a refuse vehicle control system 112 that implements such features. The refuse vehicle control system 112 comprises the operator interface 116, a refuse vehicle controller 160, the actuators 132, the position sensors 134, and a plurality of other input devices.

In a preferred embodiment, the refuse vehicle controller 160 is implemented using interface modules, and preferably comprises the interface modules 113c–113f of FIGS. 2 and 3. According to this arrangement, all of the interface modules 113 are preferably identically programmed, and the interface modules 113 each include control programs which implement a plurality of control modules 161 including an auto load module 164, component interaction control module 162, and component cushioning module 168. In one example, the interface module 113c receives I/O status information from other interface modules 113 through I/O status broadcasts, and maintains an I/O status table based on the I/O status broadcasts and based on locally acquired/determined I/O status information. The interface module 113c then controls the actuators 132c by executing those portions of the control programs pertinent to the actuators 132c and using the I/O status information stored in its I/O status table. The interface module 113d operates in the same manner, except that it controls the actuators 132d by executing those portions of the control programs pertinent to the actuators 132d. Interface modules 113e and 113f operate similarly to 113c and 113d as described. As a practical matter, there is a significant overlap between the portions of the control program pertinent to the actuators 132c and the portions of the control program pertinent to the actuators 132d. The interface modules 113a and 113b are not shown in FIG. 5, although it is to be understood that the input information from the operator interfaces 116 is received by the interface modules 113a and 113b and transmitted from the interface modules 113a and 113b to the interface modules 113c–113f in the form of an I/O status broadcast over the communication network 60. This configuration is preferred where the control system 112 is part of a larger control system that controls all or a large majority of the operations and components of the refuse vehicle, as previously described.

If the control system 112 is dedicated to refuse loader control, then preferably alternative configurations are employed. For example, the refuse vehicle controller 160 may be implemented using a single electronic control unit.

The auto load 164, component interaction control 162, component cushioning 168, and other operations and features will now be described in greater detail.

1. Auto Load

As shown in FIG. 4, the refuse vehicle controller 160 has an auto load module 164 that assists the operator in dumping a load of refuse into the hopper 103. The refuse vehicle controller 160 assists the human operator in performing various repetitive operations that are part of loading refuse in the hopper 103. The refuse vehicle controller 160 is capable of repeatedly performing the same operation at the same position(s) within the auto load sequence with a degree of precision that a human operator is unable to achieve.

As explained above, the refuse vehicle 10 can be configured to move a load along a path and into the refuse vehicle 10 using the refuse loader 110. In a preferred embodiment, the operator inputs position information into the refuse vehicle controller 160 using one of the operator interfaces 116 shown in FIG. 4. The position information corresponds to at least one position of the refuse loader 110 along the path. The position information is then used by the refuse vehicle controller 160 to perform at least one operation in relation to the position. The various types of operations are discussed further in the following. The position information may be entered in a number of ways and is not to be limited to being entered by the operator. For example, the position information may be entered by the manufacturer or in some other manner.

As shown in FIG. 4, operator inputs are received from one of the operator interfaces 116 and transmitted by the appropriate interface modules 113a or 113b in the form of I/O status broadcasts to all of the interface modules including the interface modules 113c and 113d, which form the refuse vehicle controller 160. The refuse vehicle controller 160 acquires the operator inputs and processes (e.g. scales, amplifies, power conditions, etc.) the inputs to generate control signals to control motion of the refuse loader 110. The operator inputs are also provided to the component interaction control module 162 (the above-mentioned processing may be performed before and/or after the operator inputs are provided to the component interaction control module 162). Schematically, a selector switch 175 is shown in FIG. 4 to indicate that the component interaction control module 162 uses inputs from one of the operator interfaces 116 as opposed to inputs from one of the modules 164 and 168, but it will be understood that the selector switch 175 is representative of logic that is implemented in the control program executed by the refuse vehicle controller 160.

One of the operations in which the auto load module 164 can assist the human operator is by keeping the refuse load level 170 as it travels along the path into the refuse vehicle 10. By way of explanation, the path includes the path that the refuse loader 110 and its various components travel in performing the operation of picking up a refuse bin, dumping it in the hopper 103, and placing it back on the ground.

Figure 5:
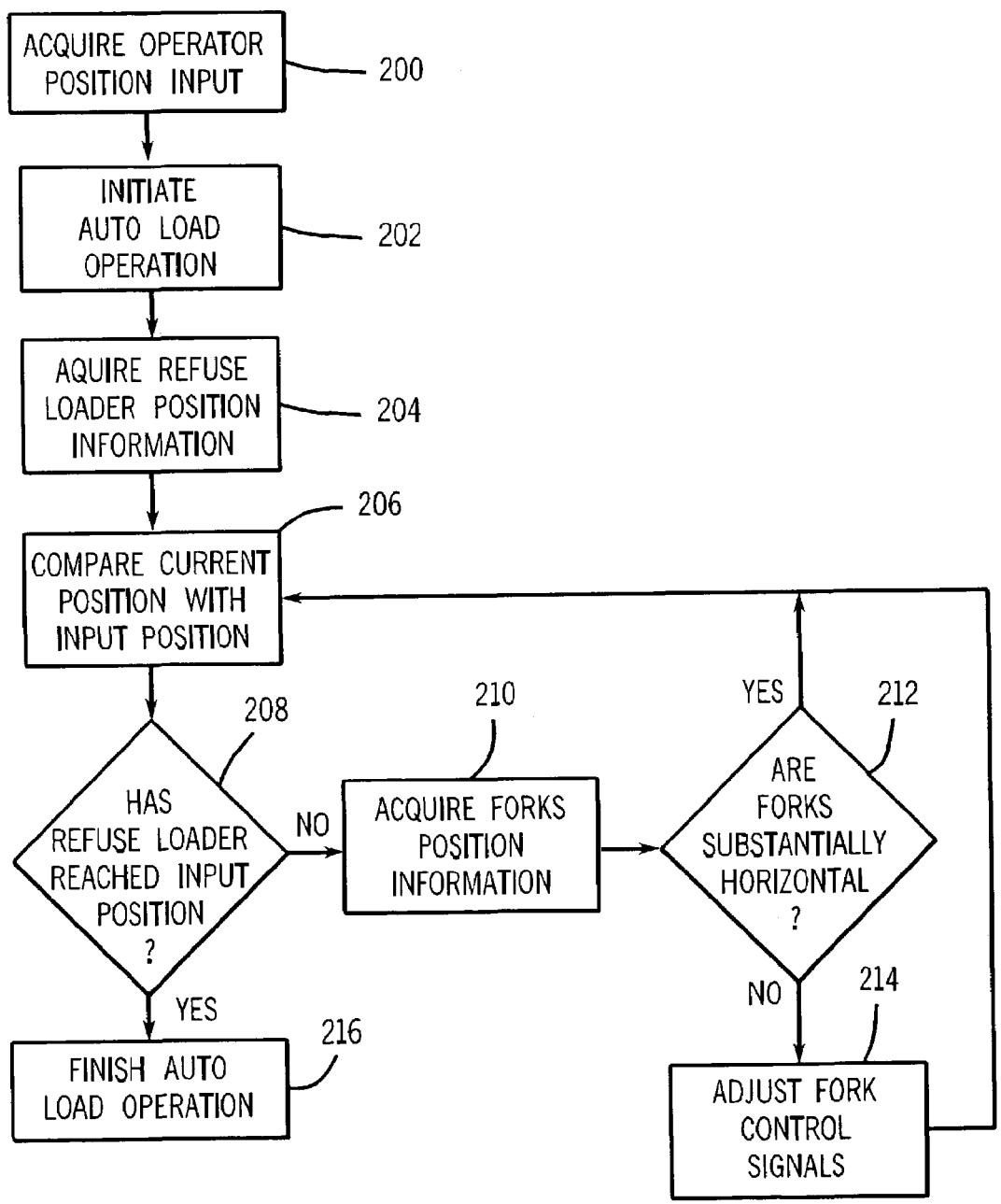
FIG. 5 is a flowchart showing a method for loading refuse into a refuse vehicle while maintaining the refuse load in a substantially horizontal position.

Maintaining the load in a level position can be accomplished in a number of ways. One exemplary embodiment is depicted in FIG. 5. At step 200, the operator initially inputs a position along the path. Alternatively, this position may be retrieved from a memory of the controller 160. Assuming the position is received from the operator, the operator may input the position of refuse loader 110 as a percentage of the overall path. For example, the operator inputs a position corresponding to 50% of the path. A further example may be for the operator to simply specify a particular position, by touching or otherwise, on a graphical representation of the path. Any of these methods is within the scope of the disclosed control system. As yet another example, the operator may input the position of the refuse loader 110 as a point in three dimensional space such as in the form of x, y, z coordinates. In addition, to entering position input, the operator may alternatively enter other input such as the angle at which the refuse vehicle control system should maintain the load until it reaches the operator input position.

After the position is entered or retrieved from memory, the operator can then initiate the auto load operation as shown at step 202. Preferably this is done by simply pushing a single button or some other equivalent single input on the part of the operator. However, other ways of initiating the auto load sequence are within the scope of the disclosed control system.

At step 204, the position of the refuse loader 110 is acquired. Preferably, the position of the refuse loader 110 can be obtained by measuring the position of the refuse loader's 110 various components, such as the arms 108 or forks 109. However, the position of the refuse loader 110 may also be obtained by other entirely different methods such as measuring the time since the auto load operation commenced and comparing that time to a calibrated stored time of how long it takes the refuse loader to reach the unload position.

At steps 206 and 208 the current position of the refuse loader 110 is compared to the position input by the operator. If the current position is above the input position then the load is no longer maintained in a substantially horizontal position, and the process proceeds to step 216. However, if the current position of the refuse loader 110 is below the operator input position then the process moves from step 208 to step 210.

At step 210, the position of the forks 109 are acquired and at step 212 analyzed to determine whether the forks 109 and/or load are substantially horizontal. Preferably, step 210 uses the position information from the position sensors to determine whether the load is substantially horizontal. However, determining whether the load is in a substantially horizontal position can be accomplished in other ways. For example, a sensor or sensing system may be employed that is mounted along an axis and that is capable of providing information regarding the orientation of the mounting axis relative to horizontal.

If the forks 109 are substantially horizontal then the process moves back to step 206. If the forks 109 are not substantially horizontal then the fork control signal is adjusted to bring the forks 109 into a substantially horizontal position.

At step 216, the load can be gradually tipped to prepare the load to be unloaded in the hopper 103. Thereafter, when performing the auto load process, the operator does not need to reenter the position information into the refuse vehicle controller 160. The operator only needs to initiate the loading sequence as shown in step 202.

Depending on the complexity of the trajectory, it may be desirable to decompose the trajectory into a series of movements separated by a series of intermediate positions. The actuators 132 may then be controlled differently during different portions of the trajectory.

While FIGS. 4 and 5 generally disclose using a feedback control loop to maintain the load in a substantially horizontal position, other methods may be used such as creating a velocity profile including the position of the arms 108 at various intervals along the path and the corresponding position of the forks 109 in a level position. In this way, the velocity profile could be used so that for a given position of the arms 108 along the path, the forks 109 would be adjusted to make the forks 109 level.

Another operation in which the auto load module 164 can assist the human operator is by shaking the load 180 once the load reaches an unload position along the path to dislodge any remaining refuse. One embodiment of this process is shown generally in FIG. 6. Before describing FIG. 6, it may be noted that the operation of shaking the load 180 and leveling the load 170 may, preferably, be combined and performed as part of the same of same auto load operation. However, if desired, the auto load operation does not have to include both operations and can include one operation without the other. Also, the auto load operation may also include further operations in addition to leveling the load 170 and shaking the load 180 in a variety of combinations.

Figure 6:
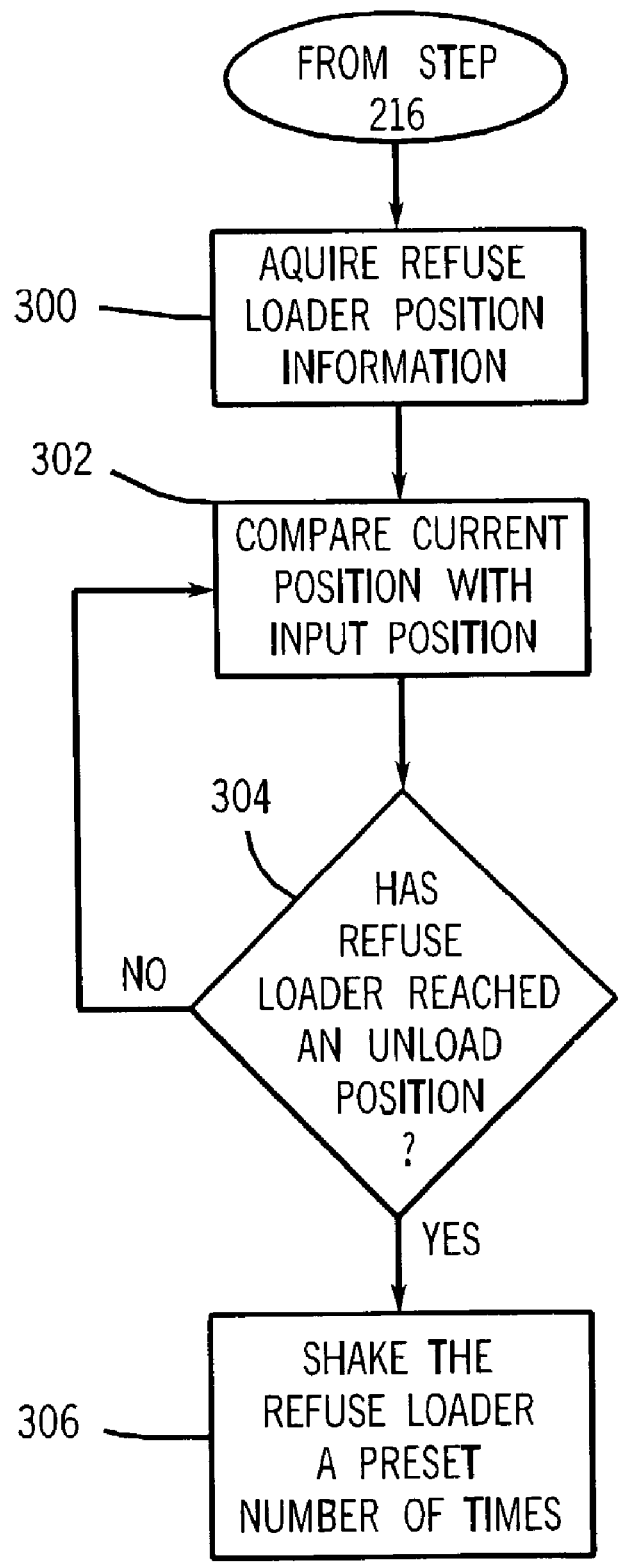
FIG. 6 is a flowchart showing a method for shaking a load of refuse a preset number of times to dislodge any stuck refuse.
Figure 7:
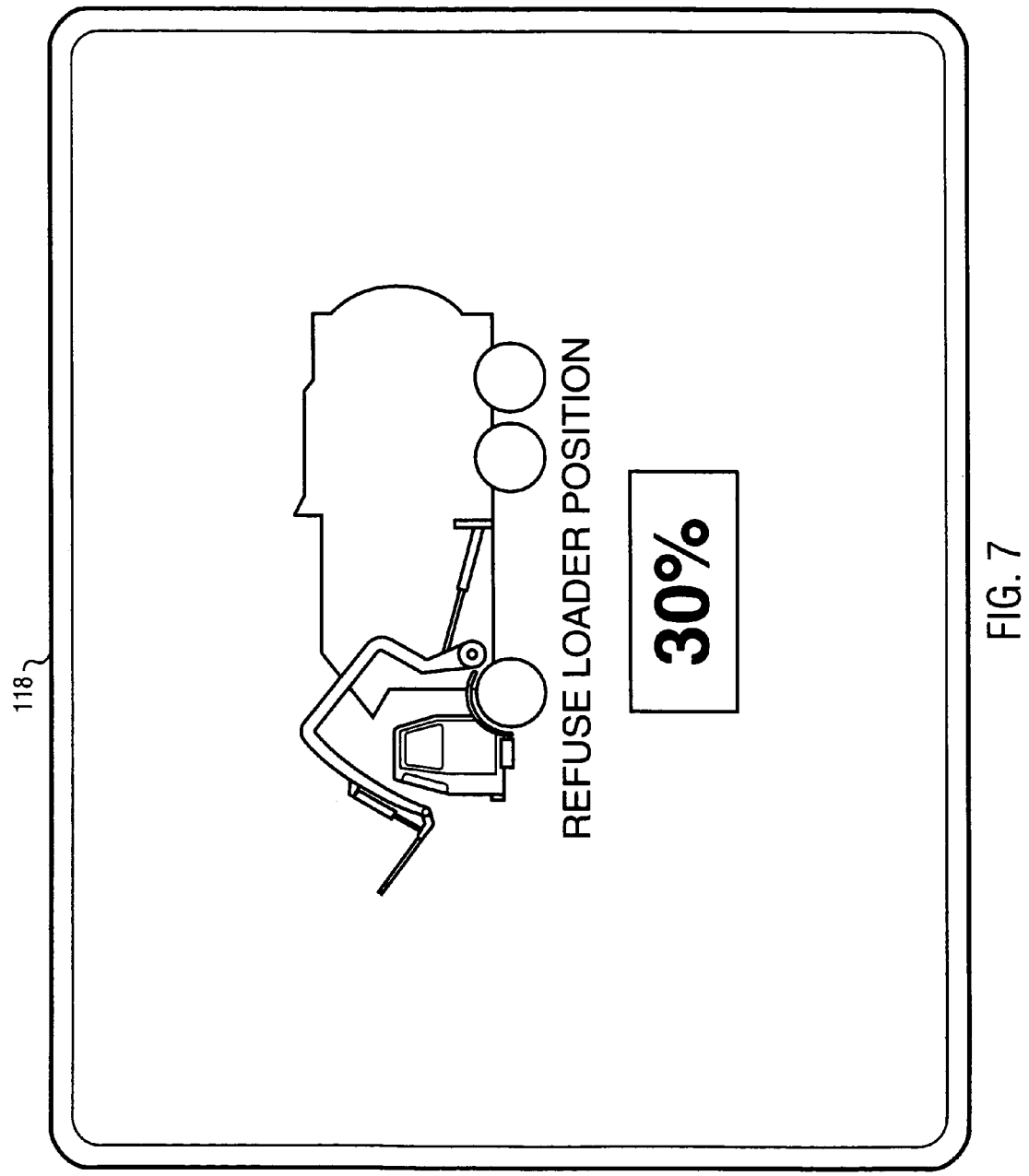
FIG. 7 is a graphical display showing the position of a refuse loader

Referring to FIG. 6, FIG. 6 discloses that after leveling the load 170, the load continues along the path. As the load continues toward the hopper 103, the refuse loader's 110 position is continually acquired and compared to the input position as shown in steps 300 and 302. The input position referred to in step 302 may be either set by the manufacturer or set by the operator or set in some other manner. Generally the position corresponds to an unload position near the hopper 103.

Figure 11:
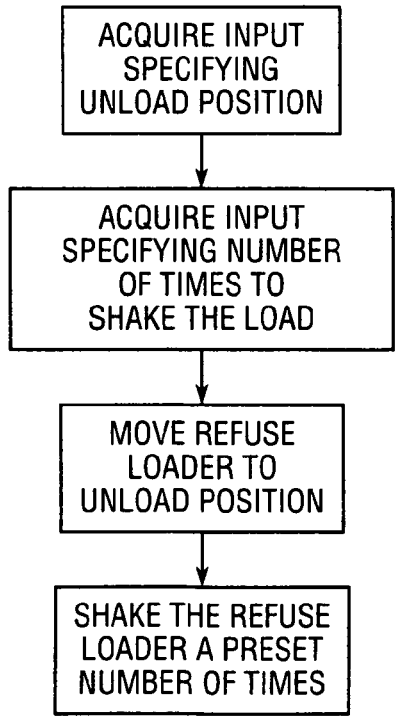
FIG. 11 is a flowchart showing the operation of shaking the load of the refuse vehicle according to one embodiment.

If the refuse loader 110 has not reached the input position then the process moves from step 304 back to step 302. If the refuse loader 110 has reached the position then the refuse loader 110 is shaken a number of times to dislodge any stuck refuse (FIG. 11). The number of times the refuse loader 110 is shaken can be input by the operator as part of step 200 or step 202 or can be input by the manufacturer so that the operator cannot modify the number of shakes. Shaking the load is typically accomplished using short repetitive movements of the refuse loader 110 and its components in opposite directions.

In another configuration, rather than using stored position inputs, the refuse controller 160 stores information that permits the simulation of operator inputs. For example, during a set-up configuration, operator inputs may be received from the joysticks 119 such that the refuse loader 110 is operated under operator control. During operator control, input signals from the joysticks 119 are stored in memory of the controller 160, thereby allowing "playback" of the input signals at a later time by the controller 160.

2. Component Interaction Control

Referring back to FIG. 4, the refuse vehicle controller 160 has a component interaction module 162 that assists the operator by preventing potentially harmful actions from being executed. Examples of many of the operations performed by the component interaction module 162 are given.

Figure 9:
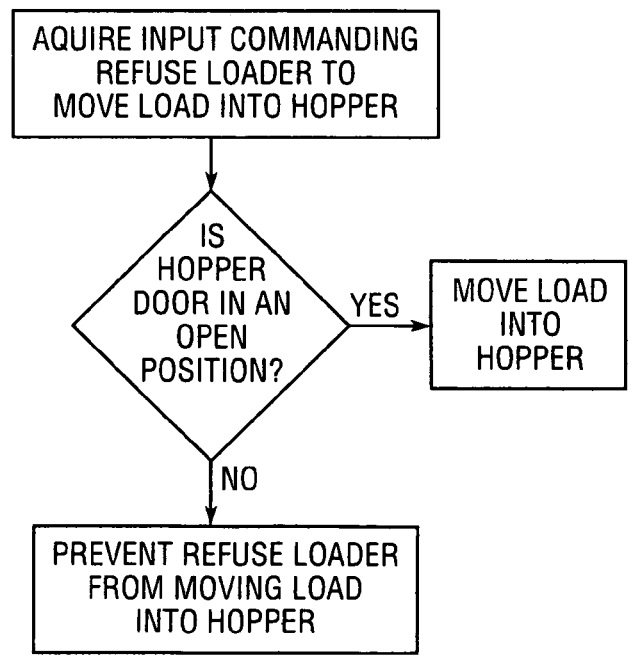

One example of the operation of the component interaction module 162 is when the operator attempts to move a load into the hopper 103 but the hopper's door is closed. This situation can be avoided using the component interaction module 162. In one instance, the operator may attempt to auto load the load into the refuse vehicle 10. The operator's input initializing the auto load operation will be input into and analyzed by component interaction module 162. Component interaction module 162 determines whether the hopper door is open. If it is not open, the component interaction module 162 intercepts the input and prevents the auto load module 164 from initializing the auto load operation. In a preferred embodiment, the refuse vehicle control system 112 displays an error message on the operator interface 116 informing the operator of the problem. In another instance, the operator may attempt to manually move a load into the refuse vehicle 10 when the hopper door is shut (FIG. 9). The component interaction module 162 determines whether there is a load on the refuse loader 110 before allowing the refuse loader 110 to be raised into a stowed position. If there is a load on the refuse loader 110, the component interaction module 162 may allow the load to only be moved a certain percentage of the distance along the path towards the hopper 103. Once that position is reached then the load could not be moved any further. In still another instance, the component interaction module may allow the refuse loader 110 to be moved toward the hopper 103 when the hopper door is closed only if the forks 109 are in a stowed position that is substantially parallel to the arms 108, thus signifying that there is no load on the refuse loader 110.

Figure 10:
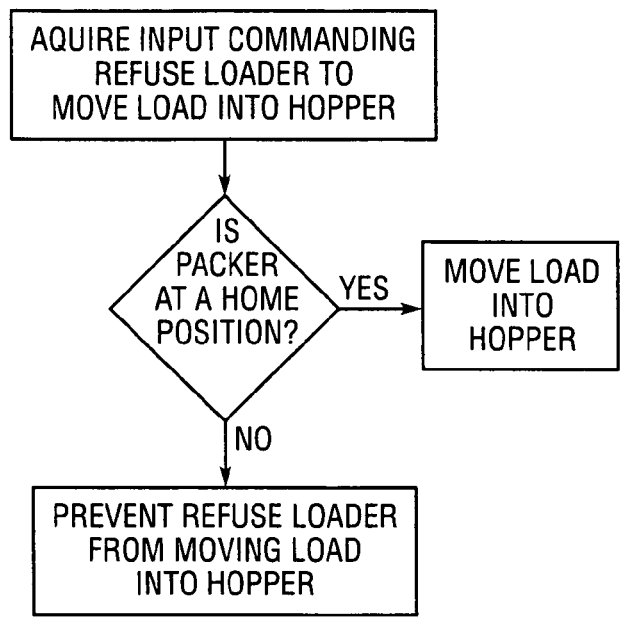

Another example of the operation of the component interaction module 162 is when the operator attempts to move a load into the hopper 103 when the packer is not at a home position. In a manner similar to preventing a load from being dumped when the hopper door is closed, the component interaction module serves to prevent the refuse from being unloaded into the hopper 103 when the packer is out of position (FIG. 10). In this situation, the component interaction module 162 ensures that before a load is dumped in the hopper the packer must be at home. If the packer is not at home the component interaction module may perform many of the same functions described above to prevent the refuse loader 110 from moving a load to the hopper 103.

A further example of the operation of the component interaction module 162 is when the tailgate 105 is raised to enable the refuse to be pushed or dumped out the of the refuse container 106. For example, if the refuse vehicle 10 is a gravity dump vehicle then the component interaction module would ensure that the tailgate 105 could be opened and the refuse container 106 lifted only after the other components of the refuse vehicle 10, e.g., the refuse loader 110, are in their stowed positions. If, for example, the forks 109 were not in a stowed position then the refuse container 106 could not be raised and/or the tailgate 105 opened. In an exemplary embodiment, an error message would be displayed on the operator interface notifying the operator of the problem. If the refuse vehicle 10 uses the packer to push the refuse out the back of the vehicle then the component interaction module 162 would not allow the packer to extend beyond the hopper portion of the refuse container 106 unless the tailgate 105 is open. Also, once the tailgate 105 is open and/or the packer is extended beyond the hopper 103 then the other components of the refuse vehicle 10, e.g., the refuse loader 110, could not be used until the packer is at home and the tailgate 105 is closed.

Figure 8:
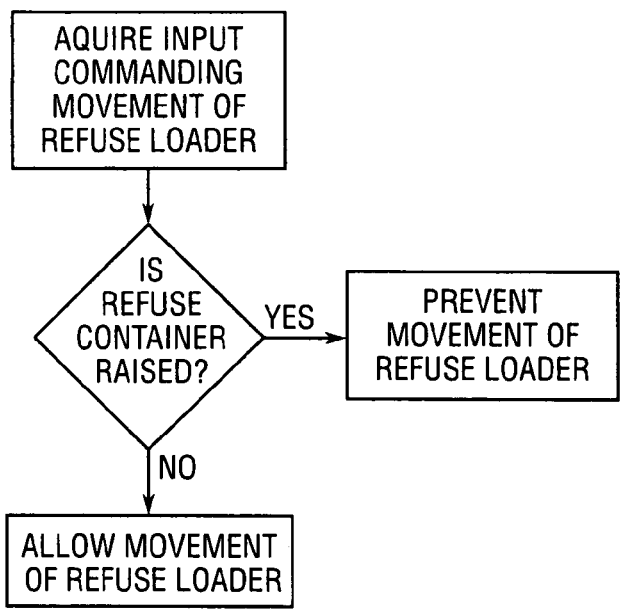
FIGS. 8–10 are flowcharts showing various embodiments of component interaction control.

The component interaction module 162 can also be used to prevent other potentially harmful component interactions. For example, if the refuse vehicle 10 is a gravity dump type vehicle or is capable of raising the refuse container 106 in order to service the vehicle then the component interaction module 162 can function to prevent the refuse container from being raised unless the refuse loader 110 is in a stowed position. Similarly, if the refuse container 106 is raised, the component interaction module 162 can prevent the front loader 110 from being moved from a stowed position (FIG. 8).

3. Component Cushioning

Figure 12:
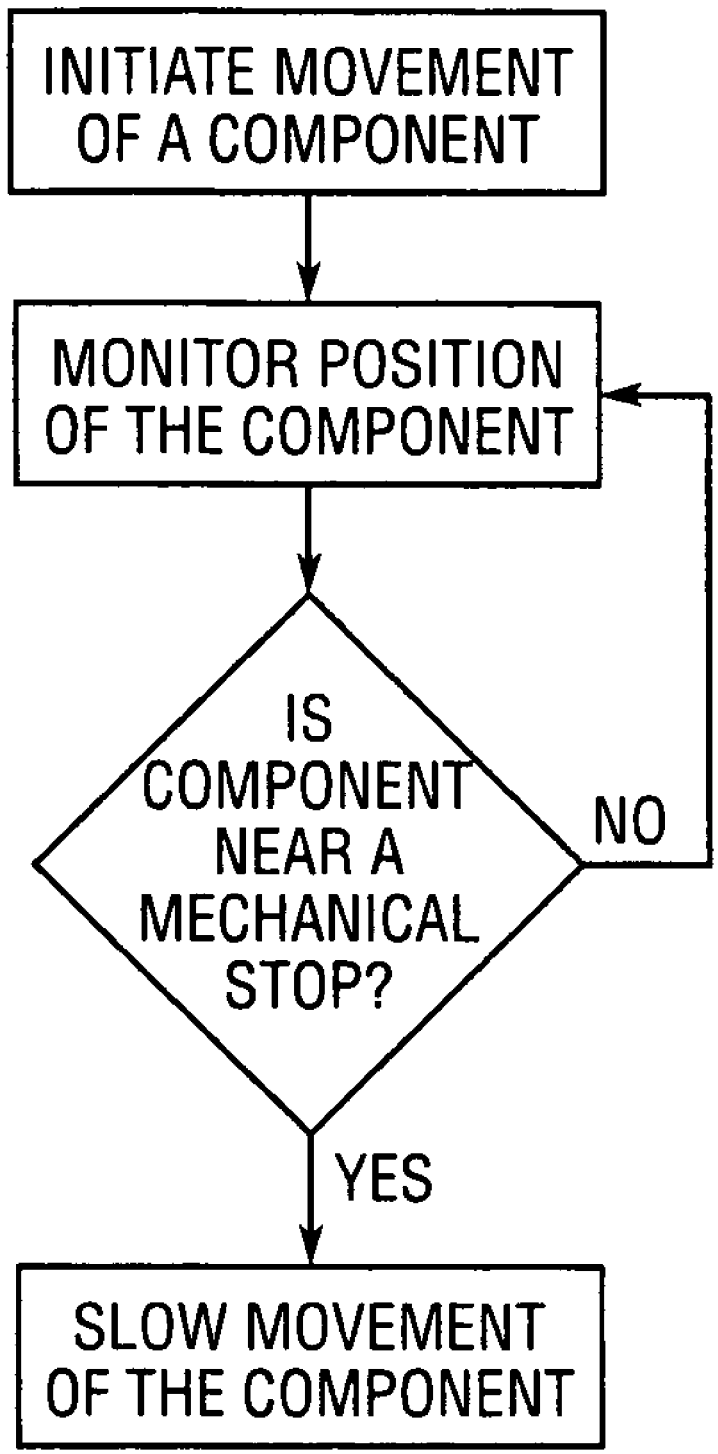
FIG. 12 is a flowchart showing one embodiment of a component cushioning operation.

Referring back to FIG. 4, the refuse vehicle controller 160 has a component cushioning module 168 that assists the operator by preventing the components of the refuse vehicle 10 from reaching their mechanical stop points (FIG. 12). Typical mechanical stop points include points where a hydraulic cylinder reaches its physical limits or where components physically meet each other or the refuse vehicle 10.

The component cushioning module 168 constantly monitors the position of various components and ensures that they do not meet their mechanical stop points. For example, during the auto load sequence, the component cushioning module 168 is given the position of the refuse loader 110 and its components, namely, the arms 108 and forks 109. If the operator has input a position to perform the shaking operation 180 that is too close to the mechanical stops of the arms 108, for example, then the component cushioning module 168 will adjust the operator's input accordingly to keep it a specified distance from the mechanical stops. The distance may be set by the operator as an input or may be set by the manufacturer. One exemplary distance is 4 inches from the mechanical stops of a component. However, other distances, such as between 2 and 5 inches will work as well.

As previously noted the construction and arrangement of the various aspects of the refuse vehicle control system 112 shown in the preferred and other exemplary embodiments are illustrative only. Although only a few embodiments of the present inventions have been described in detail in this disclosure, those skilled in the art who review this disclosure will readily appreciate that many modifications are possible without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the preferred and other exemplary embodiments without departing from the scope of the present inventions as expressed in the appended claims.

What is claimed is:

1. A refuse vehicle comprising:
a refuse loader used to move a load of refuse along a path and into the refuse vehicle; and
an electronic control system used to control the refuse loader as the refuse loader moves the load of refuse along the path;
wherein the electronic control system is also used to shake the load at an unload position a preset number of times, the electronic control system is configured to receive input from an operator specifying the number of times to shake the load.

2. The refuse vehicle of claim 1, wherein the electronic control system is used to maintain the load in a substantially horizontal position as the load moves along at least a portion of the path.

3. The refuse vehicle of claim 1, wherein the electronic control system is used to slow the movement of the refuse loader as it nears the unload position.

4. The refuse vehicle of claim 3, wherein the unload position corresponds to a mechanical stop.

5. The refuse vehicle of claim 1, further comprising position sensors which are used to determine the position of the refuse loader.

6. The refuse vehicle of claim 1, wherein the electronic control system is configured to receive input from an operator specifying the unload position.

7. The refuse vehicle of claim 6, wherein the unload position is stored in memory.

8. The refuse vehicle of claim 1, further comprising a graphical interface used to display a position of the refuse loader as it moves along the path.

9. The refuse vehicle of claim 8, wherein the graphical interface displays the position of the refuse loader as the refuse loader moves a load of refuse alone the path using numerical percentages and/or by displaying a graphical representation of the refuse loader.

10. The refuse vehicle of claim 9, further comprising arms and forks, wherein the graphical interface displays the position of the arms or forks.

11. The refuse vehicle of claim 1, comprising
a hopper; and
a door which is used to cover the hopper;
wherein the control system is used to prevent the refuse loader from moving a load into the hopper when the door is not in an open position.

12. The refuse vehicle of claim 1, comprising
a hopper; and
a packer;
wherein the control system is used to prevent the refuse loader from moving a load into the hopper when the packer is not at a home position.

13. The refuse vehicle of claim 1, wherein the electronic control system comprises
(1) a plurality of input devices;
(2) a plurality of output devices including an actuator which is used to move the refuse loader;
(3) a communication network;
(4) a plurality of microprocessor-based interface modules, the plurality of interface modules being interconnected to each other by way of the communication network, and the plurality of interface modules being coupled to the plurality of input devices and to the plurality of output devices by way of respective communication links.

14. The refuse vehicle of claim 13, wherein the actuator is a hydraulic valve.

15. A refuse vehicle comprising:
a refuse loader;
a refuse container capable of being raised, the refuse container being used to store refuse as it is collected; and
an electronic control system which is used to control the refuse loader;
wherein the electronic control system is used to prevent the refuse loader from moving when the refuse container is in a raised position.

16. The refuse vehicle of claim 15, wherein the electronic control system is used to control the refuse container and prevent the refuse container from being raised when the refuse loader is not in a stowed position.

17. A method of operating a refuse vehicle comprising:
moving a load of refuse along a path and into the refuse vehicle using an electronic control system, the electronic control system also being used to shake the load a preset number of times, wherein the electronic control system is capable of receiving input from an operator specifying the number of times to shake the load.

18. The method of claim 17, wherein the electronic control system is used to maintain the load in a substantially horizontal position as the load moves along at least a portion of the path.

19. The method of claim 17, wherein the moving step is performed in response to a single operator input.

20. The method of claim 17, wherein the electronic control system is capable of receiving input from an operator specifying a position along the path to shake the load.

21. The method of claim 17, wherein the refuse loader further comprises arms and forks.

22. The method of claim 21, wherein the electronic control system includes position sensors which are used to determine the position of the arms and/or the forks.

23. The method of claim 17, further comprising using the electronic control system to slow the movement of the refuse loader as it nears a mechanical stop.

24. The method of claim 17, comprising displaying a position of the refuse loader on a graphical interface as the refuse loader moves along the path.

25. A refuse vehicle comprising:
a refuse loader which is used to move a load of refuse along a path and into the refuse vehicle; and
an electronic control system which is used to control movement of the refuse loader, the electronic control system including a graphical interface which is used to display a position of the refuse loader, the position of the refuse loader being determined using a position sensor;
wherein the graphical interface displays the position of the refuse loader as a numerical percentage.

26. The refuse vehicle of claim 25, wherein the graphical interface displays a graphical representation of the refuse loader.

27. The refuse vehicle of claim 25, wherein the refuse loader includes arms and forks, the graphical interface displaying a position of at least one of the arms or the forks.

28. A refuse vehicle comprising:
a refuse loader which is used to move a load of refuse along a path and into the refuse vehicle; and a control system which comprises
- (1) a plurality of input devices;
- (2) a plurality of output devices including an actuator which is used to move the refuse loader;
- (3) a communication network;
- (4) a graphical interface which is used to display a position of the refuse loader;
- (5) a plurality of microprocessor-based interface modules, the plurality of interface modules being interconnected to each other by way of the communication network, and the plurality of interface modules being coupled to the plurality of input devices and to the plurality of output devices by way of respective communication links;

wherein the graphical interface displays the position of the refuse loader as a numerical percentage.

29. The refuse vehicle of claim 28, wherein the graphical interface is positioned in an operator compartment of the refuse vehicle.

30. The refuse vehicle of claim 28, wherein the graphical interface displays a graphical representation of the refuse loader.

31. The refuse vehicle of claim 28, wherein the actuator is a hydraulic valve.

* * * * *

UNITED STATES PATENT AND TRADEMARK OFFICE
CERTIFICATE OF CORRECTION

| | | |
|---|---|---|
| PATENT NO. | : 7,072,745 B2 | Page 1 of 1 |
| APPLICATION NO. | : 10/314918 | |
| DATED | : July 4, 2006 | |
| INVENTOR(S) | : Duane R. Pillar et al. | |

It is certified that error appears in the above-identified patent and that said Letters Patent is hereby corrected as shown below:

Column 13:
Line 41, replace "alone" with --along--.

Signed and Sealed this

Fourteenth Day of November, 2006

JON W. DUDAS
*Director of the United States Patent and Trademark Office*